(12) United States Patent
Kim

(10) Patent No.: US 8,681,284 B2
(45) Date of Patent: Mar. 25, 2014

(54) LIQUID CRYSTAL DISPLAY DEVICE

(75) Inventor: Ki-Won Kim, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 506 days.

(21) Appl. No.: 12/623,834

(22) Filed: Nov. 23, 2009

(65) Prior Publication Data

US 2010/0128196 A1    May 27, 2010

(30) Foreign Application Priority Data

Nov. 26, 2008    (KR) .................. 10-2008-0118046

(51) Int. Cl.
G02F 1/1333    (2006.01)
G02F 1/1345    (2006.01)

(52) U.S. Cl.
USPC ............................................. 349/58; 349/150

(58) Field of Classification Search
USPC ..................................... 349/58–60, 149, 150
See application file for complete search history.

(56) References Cited

U.S. PATENT DOCUMENTS

| | | | |
|---|---|---|---|
| 2002/0088629 A1* | 7/2002 | Jeon | 174/35 R |
| 2004/0212756 A1* | 10/2004 | Fukayama et al. | 349/58 |
| 2005/0146650 A1* | 7/2005 | Chung et al. | 349/58 |
| 2005/0286008 A1* | 12/2005 | Miyagawa et al. | 349/158 |
| 2007/0188675 A1* | 8/2007 | Tsubokura et al. | 349/58 |
| 2008/0043413 A1* | 2/2008 | Okuda | 361/681 |

FOREIGN PATENT DOCUMENTS

| | | |
|---|---|---|
| KR | 10-2005-0027677 | 3/2005 |
| KR | 10-2005-0068530 | 7/2005 |

OTHER PUBLICATIONS

Korean Office Action dated Jun. 28, 2011 from corresponding Korean Patent Application No. 10-2008-0118046.

* cited by examiner

Primary Examiner — Jessica M Merlin
(74) Attorney, Agent, or Firm — Morgan, Lewis & Bockius LLP

(57) ABSTRACT

The present invention relates to a liquid crystal display device, and more particularly, to a liquid crystal display device in which a shock-absorbing member is provided in a liquid crystal display device that is provided as an element of a mobile communication system, thereby ensuring the stability of a driver integrated circuit against an external shock. The present invention may be accomplished by providing a liquid crystal panel including a first substrate and a second substrate; a driver integrated circuit mounted on the second substrate of the liquid crystal panel for driving the liquid crystal panel; a backlight assembly arranged at a lower portion of the liquid crystal panel for providing light into the liquid crystal panel; a main support for accommodating the liquid crystal panel and backlight assembly; and a lower cover arranged to surround an outside of the main support, and provided with a shock-absorbing member in a form that is extended from an upper surface of a lateral portion thereof adjacent to the driver integrated circuit and folded in a direction of the driver integrated circuit.

3 Claims, 3 Drawing Sheets

LIQUID CRYSTAL DISPLAY DEVICE

CROSS-REFERENCE TO RELATED APPLICATIONS

Pursuant to 35 U.S.C. §119(a), this application claims the benefit of earlier filing date and right of priority to Korean Application No. 10-2008-0118046 filed on Nov. 26, 2008, the contents of which are incorporated by reference herein in its entirety.

BACKGROUND OF THE INVENTION

1. Field of the Invention

The present invention relates to a liquid crystal display device, and more particularly, to a liquid crystal display device in which a shock-absorbing member is provided in a liquid crystal display device that is provided as a constituent element of a mobile communication system, thereby ensuring the stability of a driver integrated circuit against an external shock.

2. Description of the Related Art

In general, a display unit for displaying a screen is provided in a mobile communication system such as a portable phone, a personal digital [data] assistant (PDA), and the like, as well as a portable computer. For such a display unit, the trend of employing a liquid crystal display device having advantageous characteristics such as small size, light weight, low power consumption, and the like, continues to increase.

The liquid crystal display device displays desired images on a screen thereof by controlling an amount of the optical transmission based on image signals applied to a plurality of control switching elements arranged in a matrix form.

The liquid crystal display device is configured by including a liquid crystal panel in which a color filter substrate that is an upper substrate and a thin-film transistor array substrate that is a lower substrate are disposed to face to each other and a liquid crystal layer is formed between the two substrates, and a driving unit for operating the liquid crystal panel by supplying scan signals and image information to the liquid crystal panel.

The liquid crystal display device having the foregoing configuration is a non-spontaneous light emitting device, whereas a cathode ray tube (CRT) or a light emitting diode (LED) is a spontaneous light emitting device. Accordingly, for image implementation, it is necessary for the LCD device to be provided with a light source to supply light to the liquid crystal panel.

Hereinafter, a typical conventional liquid crystal display device and a typical conventional mobile communication system having the liquid crystal display device will be described with reference to the accompanying drawings. Describing such a typical conventional technology, a portable phone will be used as an example, among mobile communication systems.

As illustrated in FIG. 1, a typical portable phone 11 is configured by including a main body unit 13, and a display unit 12 for displaying information transferred from the main body unit 13.

The main body unit 13 includes a driving unit (not shown) for driving overall functions of the portable phone, a keypad 13a, and a case 13b, and the display unit 12 includes a liquid crystal display device 12a, a keypad 12b, and a case 12c.

FIG. 2 is a cross-sectional diagram illustrating a typical conventional liquid crystal display device 12a, which is provided as an element of the display unit 12 in the portable phone 11. Referring to FIG. 2, the typical conventional liquid crystal display device 12a includes a liquid crystal panel 1 having a first substrate 1a that is a color filter substrate and a second substrate 1b that is a thin-film transistor array substrate, a driver integrated circuit 2 mounted on an end of the second substrate 1b for driving the liquid crystal panel 1, and a backlight assembly 3 arranged at a lower portion of the liquid crystal panel 1 for emitting light into the liquid crystal panel 1.

Though not shown specifically in the drawing, the backlight assembly 3 includes an light emitting diode 3a, a light-guide plate 3b for guiding light emitted from the light emitting diode 3a toward the liquid crystal panel 1, a reflector sheet 3c for reflecting light leaked to a lower portion of the light-guide plate 3b into an inside of the light-guide plate 3b, and an optical sheet 3d for converting light emitted from the light-guide plate 3b and providing it to the liquid crystal panel 1.

The portable phone 11 provided with a liquid crystal display device 12a having the foregoing construction has an advantage of easy portability, but there frequently occurs a problem that the driver integrated circuit 2 mounted on the liquid crystal panel 1 can be destructed by a shock generated by an accidental drop while carrying the phone or by a pressure generated by a push operation.

Accordingly, at present, in various mobile communication systems including the foregoing portable phone 11, attention is concentrated on how to solve a problem in which the driver integrated circuit 2 of the liquid crystal display device 12a, which is provided as an element of the mobile communication system, may be destructed by an external shock. In order to ensure the stability of the driver integrated circuit 2 in the liquid crystal display device 12a, in fact, the mobile communication equipment manufacturer performs a static pressure test after completing the manufacture of the products, and only the products that have passed the static pressure test are released on the market.

Referring to FIG. 2, the static pressure test is performed by exerting the pressure on a rear surface of the lower cover 5 corresponding to the position of the driver integrated circuit 2 by using static pressure test equipment.

If the data having less than a reference value is found greater than an optimal level or the average value of data is less than an optimal level after performing the foregoing static pressure test, then the product will not be released on the market, thereby causing a problem that the yield of producing mobile communication systems as well as liquid crystal display devices may be reduced.

SUMMARY OF THE INVENTION

The present invention is contrived to solve the aforementioned problem and an object of the invention is to provide a liquid crystal display device in which a shock-absorbing member is provided in a liquid crystal display device that is provided as an element of a mobile communication system, thereby ensuring the stability of a driver integrated circuit against an external shock.

In order to accomplish the foregoing object, a liquid crystal display device according to an embodiment of the present invention is characterized by including a liquid crystal panel including a first substrate and a second substrate; a driver integrated circuit mounted on the second substrate of the liquid crystal panel for driving the liquid crystal panel; a backlight assembly arranged at a lower portion of the liquid crystal panel for providing light into the liquid crystal panel; a main support for accommodating the liquid crystal panel and backlight assembly; and a lower cover arranged to surround an outside of the main support, and provided with a shock-absorbing member in a form that is extended from an upper surface of a lateral portion thereof adjacent to the driver integrated circuit and folded in a direction of the driver integrated circuit.

According to a liquid crystal display device in accordance with a preferred embodiment of the present invention having the foregoing construction, a shock-absorbing member is provided on the lower cover and the cross section of the lower cover is widened, and therefore, when a shock is applied from the outside to a rear surface of the lower cover, the shock will be absorbed and not delivered to the driver integrated circuit, or even if the shock is delivered an insignificant shock will be delivered to the driver integrated circuit, thereby having an advantage of ensuring the stability of the driver integrated circuit.

Accordingly, in case where the liquid crystal display device is provided as an element of a mobile communication system, a screen failure due to the damage of the driver integrated circuit will not be generated when the mobile communication system is accidentally dropped or a pressure is applied by pressing the mobile communication system, thereby having an advantage of ensuring the reliability of the product.

Furthermore, during a static pressure test performed after completing the manufacture of the liquid crystal display devices, most of data are found above a reference level and the average value of the data is found above a reference value so that the products will be released on the market without difficulty, thereby having an effect of enhancing the yield of producing mobile communication systems as well as liquid crystal display devices.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, the present invention will be described in detail with reference to the accompanying drawings.

Figure 3:
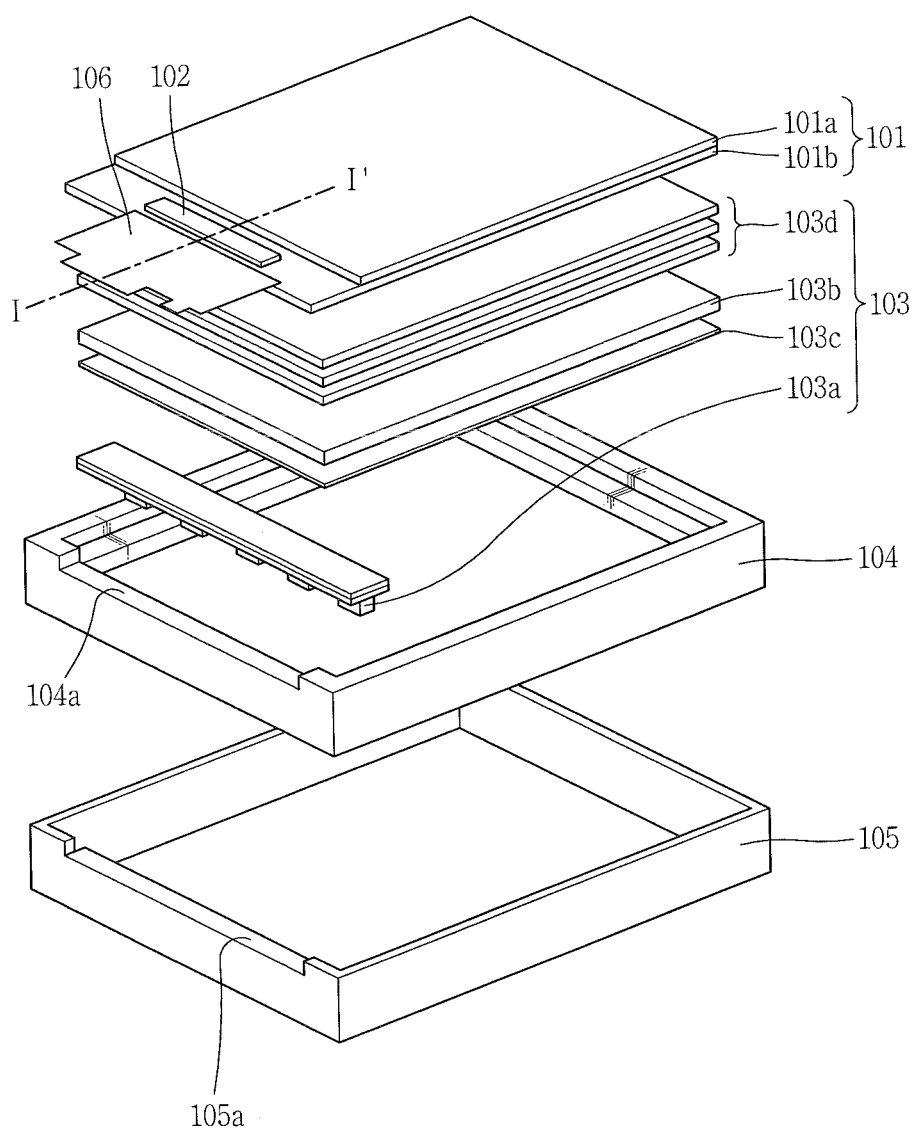
FIG. 3 is an exploded perspective view illustrating a liquid crystal display device according to a preferred embodiment of the present invention.
Figure 4:
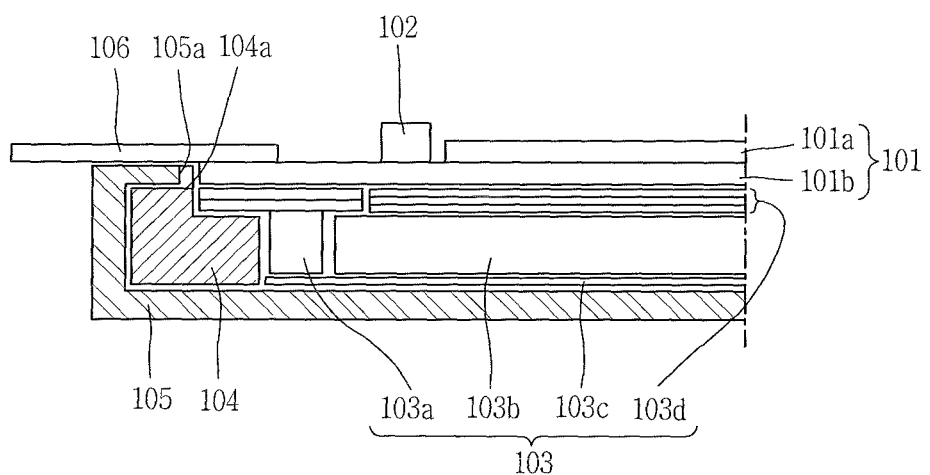
FIG. 4 is a cross-sectional view illustrating a cross section cut along a line I-I' of FIG. 3.

As illustrated in FIGS. 3 and 4, a liquid crystal display device according to a preferred embodiment of the present invention is configured by including a liquid crystal panel 101 including a first substrate 101a and a second substrate 101b; a driver integrated circuit 102 mounted on the second substrate 101b of the liquid crystal panel 101 for driving the liquid crystal panel 101; a backlight assembly 103 arranged at a lower portion of the liquid crystal panel 101 for providing light into the liquid crystal panel 101; a main support 104 for accommodating the liquid crystal panel 101 and backlight assembly 103; and a lower cover 105 arranged to surround an outside of the main support 104, and provided with a shock-absorbing member 105a in a form that is extended from an upper surface of a lateral portion thereof adjacent to the driver integrated circuit 102 and folded in a direction of the driver integrated circuit 102.

Each element of the liquid crystal display device according to a preferred embodiment of the present invention will be described in detail as follows.

Referring to FIGS. 3 and 4, the liquid crystal panel 101 is configured with a first substrate 101a that is a color filter substrate and a second substrate 101b that is a thin-film transistor array substrate, and a liquid crystal layer (not shown) is formed between the two substrates 101a, 101b.

The first substrate 101a and the second substrate 101b of the liquid crystal panel 101, as illustrated in FIG. 3, are formed in a different width on some parts of the region thereof and there exist some non-overlapped parts of the region, and in particular some parts of the region on the second substrate 101b are formed larger than the first substrate 101a, thereby exposing some parts of the region on an upper surface of the second substrate 101b.

A driver integrated circuit 102 including a driving unit for driving the liquid crystal panel 101 is mounted on the exposed region of the second substrate 101b that does not overlap with the first substrate 101a.

Furthermore, in a liquid crystal display device according to a preferred embodiment of the present invention, a keypad (not shown) for functioning as an external input means when provided as an element of the mobile communication system is additionally provided, and a flexible printed circuit board 106 for connecting the driver integrated circuit 102 with the keypad is also additionally provided.

Here, the keypad (not shown) is arranged adjacent to the exposed region of the second substrate 101b that does not overlap with the first substrate 101a, and the flexible printed circuit board 106 is electrically attached to the exposed region of the second substrate 101b that does not overlap with the first substrate 101a and thus electrically connected to the driver integrated circuit 102 on the second substrate 101b.

Referring to FIG. 3, furthermore, a backlight assembly 103 for emitting light into the liquid crystal panel 101 is provided on a lower portion of the liquid crystal panel 101, and the backlight assembly 103 is configured by including a light source 103a for emitting light, a light-guide plate 103b for guiding light emitted from the light source 103a toward the liquid crystal panel 101, a reflector sheet 103c for reflecting light leaked to a lower portion of the light-guide plate 103b into an inside of the light-guide plate 103b, and an optical sheet 103d for converting light emitted from the light-guide plate 103b and providing it to the liquid crystal panel 101.

The liquid crystal panel 101 and backlight assembly 103 should be protected to prevent light loss and damage from external shock. For this purpose, there are provided a main support 104 for accommodating the liquid crystal panel 101 and the backlight assembly 103, and a case including a lower cover 105 arranged to surround an outside of the main support 104.

Referring to FIGS. 3 and 4, a groove 104a for pulling a flexible printed circuit board 106 out of the inside of the main support 104 to the outside thereof is formed on an upper surface of the lateral portion of the main support 104 adjacent to the driver integrated circuit 102.

Preferably, the groove 104a of the main support 104 has at least a same width as that of the flexible printed circuit board 106, and also preferably has at least a same thickness as that of the flexible printed circuit board 106.

Referring to FIGS. 3 and 4, a lower cover 105 is arranged to surround an external surface of the main support 104 outside the main support 104, and a shock-absorbing member 105a having a shape that is extended from an upper surface of a lateral portion thereof adjacent to the driver integrated circuit 102 and folded by 90 degrees in a direction of the driver integrated circuit 102 is provided in the lower cover 105.

The shock-absorbing member 105a of the lower cover 105 includes a rear and an upper surfaces thereof, and the rear surface thereof is positioned to be adjacent to or make contact with an upper surface of the lateral portion of the main support 104, and the upper surface thereof is positioned to be adjacent to or make contact with a rear surface of the flexible printed circuit board 106.

Furthermore, in case where a groove 104a having a purpose of pulling a flexible printed circuit board 106 out of the inside of the main support 104 to the outside thereof is formed on an upper surface of the lateral portion of the main support 104, the shock-absorbing member 105a of the lower cover 105 is positioned inside the groove 104a of the main support 104, and the rear surface thereof is formed to be adjacent to or make contact with a bottom surface within the groove 104a of the main support 104.

According to a liquid crystal display device in accordance with an embodiment of the present invention having the foregoing construction, a shock-absorbing member 105a is provided on a lower cover 105 thereof and has a wide cross section thereof, and therefore, even when an external shock is applied, the shock is absorbed, thereby having an effect of ensuring the stability of the driver integrated circuit 102. Concerning this, a result using a static pressure tester in a liquid crystal display device according to a preferred embodiment of the present invention is illustrated below in Table 1, and a result examined using a static pressure tester in a typical conventional liquid crystal display device is also illustrated in Table 1.

TABLE 1

| No | Related art | Present invention |
|---|---|---|
| 1 | 3.44 | 2.513 |
| 2 | 3.49 | 2.8 |
| 3 | 2.47 | 2.478 |
| 4 | 3.55 | 2.281 |
| 5 | 3.6 | 2.326 |
| 6 | 3.09 | 2.532 |
| 7 | 2.36 | 2.818 |
| 8 | 2.93 | 2.604 |
| 9 | 2.4 | 3.128 |
| 10 | 3.44 | 2.5 |
| 11 | 2.96 | 2.496 |
| 12 | 3.5 | 2.376 |
| 13 | 3.74 | 2.428 |
| 14 | 1.48 | 2.467 |
| 15 | 2.45 | 2.676 |
| 16 | 3.15 | 2.761 |
| 17 | 2.56 | 3.222 |
| 18 | 3.14 | 2.981 |
| 19 | 3.26 | 2.446 |
| 20 | 1.95 | 2.43 |
| 21 | 3.32 | 3.211 |
| 22 | 1.75 | 2.835 |
| 23 | 3.02 | 2.23 |
| 24 | 3.39 | 2.43 |
| Average | 2.94 | 2.615 |

Figure 1:
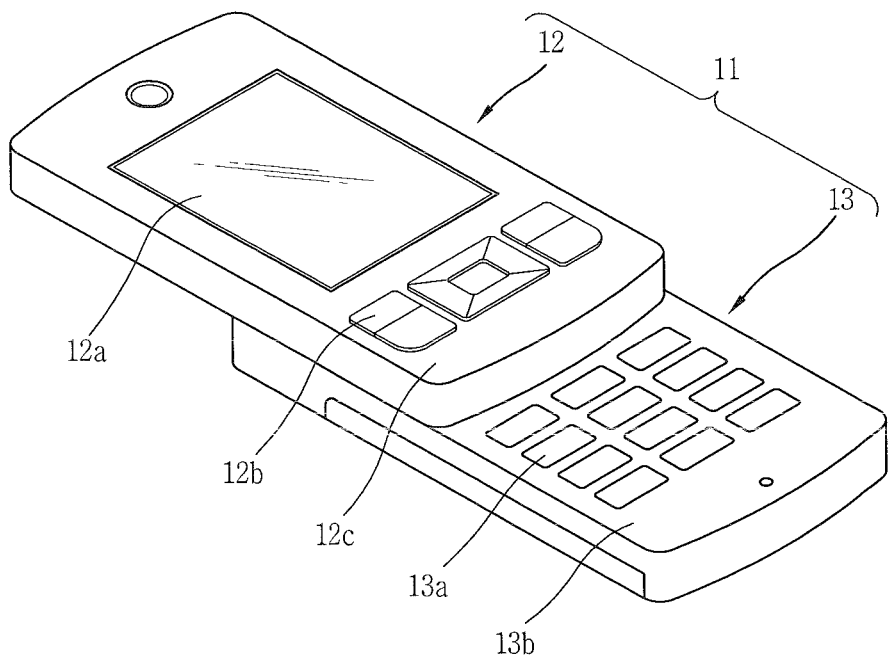
FIG. 1 is a perspective view illustrating a typical portable phone provided with a typical conventional liquid crystal display device.
Figure 2:
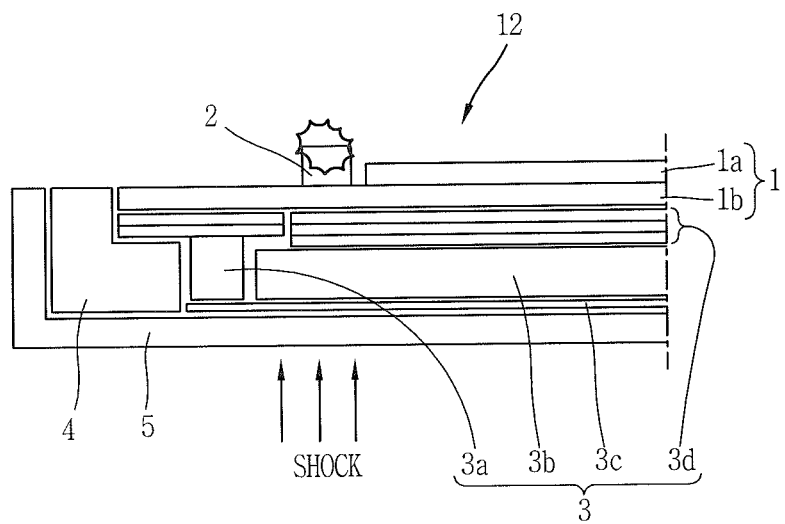
FIG. 2 is a cross-sectional view illustrating a typical liquid crystal display device provided in the portable phone of FIG. 1.

As illustrated in the above Table 1, a plurality of measurement results are illustrated as a value when the driver integrated circuit 102 is damaged while gradually increasing a pressure applied to the region adjacent to the driver integrated circuit 102 on a rear surface of the lower cover 105 with a predetermined speed (for example, 5 mm/min). Here, the value, that is, the pressure applied to a rear surface of the lower cover 105, is illustrated as a unit of weight (kgf). Furthermore, as illustrated in the above Table 1, in case of the related art, the test results are shown for a model in which the thickness of the lower cover (refer to reference numeral 5 of FIG. 2) is 0.2 mm, and the thickness of the first substrate (refer to reference numeral 1a of FIG. 2) and second substrate (refer to reference numeral 1b of FIG. 2) is 0.3 mm, respectively, and the overall thickness of the liquid crystal display device is about 1.9 mm. In case of the present invention, the test results are shown for a model in which the thickness of the lower cover 105 is 0.15 mm, and the thickness of the first substrate 101a and second substrate 101b is 0.2 mm, respectively, and the overall thickness of the liquid crystal display device is about 1.3 mm.

As illustrated in the above Table 1, if the data having less than a reference value among the test result values is found greater than an optimal level or the average value of test result values is measured less than an optimal level, then the product will not be released on the market. In case where a reference value of the static pressure test is 2 kgf, it may be seen that the number of data having less than the reference value is three in case of the related art, and there is no data having less than the reference value in case of the present invention, and also it may be seen that the average value satisfies the reference value of the static pressure test both in case of the related art and present invention.

In other words, any data having less than the reference value are not found during the static pressure test, and therefore, it may be seen that the driver integrated circuit has not been damaged by an external shock.

In addition, according to the present invention, any data having less than the reference value are not found though a static pressure test is performed for a model in which the thickness of the lower cover 105 is thinner by 0.05 mm, the thickness of the first substrate 101a and second substrate 101b is thinner by 0.1 mm, respectively, and the overall thickness of the liquid crystal display device is also thinner by 0.6 mm, compared to the related art. As a result, it may be seen that the driver integrated circuit 102 will not be damaged by an external shock in case where the thickness of the lower cover 105 is formed with 0.2 mm as in the related art, or the thickness of the first substrate 101a and second substrate 101b is formed with 0.3 mm, respectively, or the overall thickness of the liquid crystal display device is formed with 1.3 mm as in the related art.

According to a liquid crystal display device in accordance with a preferred embodiment of the present invention, as described above, a shock-absorbing member 105a is provided on a lower cover 105 thereof and has a wide cross section, and therefore, when an external shock is applied to a rear surface of the lower cover 105, the shock will be absorbed and not delivered to the driver integrated circuit, or an insignificant shock will be delivered to the driver integrated circuit 102 even if the shock is delivered, thereby having an advantage of ensuring the stability of the driver integrated circuit 102.

Accordingly, in case where a liquid crystal display device according to the present invention is provided as an element of a mobile communication system, a screen failure due to the damage of the driver integrated circuit 102 will not be generated when the mobile communication system is accidentally dropped or a pressure is applied by pressing the mobile communication system by a user, thereby having an advantage of ensuring the reliability of the product.

Furthermore, during a static pressure test performed after completing the manufacture of the liquid crystal display devices, most of data will be found above a reference level and the products will be released on the market without difficulty, thereby having an effect of enhancing the yield of producing mobile communication systems as well as liquid crystal display devices.

What is claimed is:

1. A liquid crystal display device, the device comprising:
   a liquid crystal panel including a first substrate and a second substrate, and exposing some parts of a region on an upper surface of the second substrate;
   a driver integrated circuit mounted on the exposed region of the second substrate that does not overlap with the first substrate for driving the liquid crystal panel;
   a flexible printed circuit board electrically attached to the exposed region of the second substrate that does not overlap with the first substrate for connecting the driver integrated circuit with a keypad;
   a backlight assembly arranged at a lower portion of the liquid crystal panel for providing light into the liquid crystal panel;
   a main support having a sidewall, and having a stepped portion surrounding an inside of the sidewall for accommodating the liquid crystal panel and backlight assembly;
   a groove formed on an upper surface of the sidewall of the main support adjacent to the driver integrated circuit for pulling the flexible printed circuit board out of the inside of the sidewall of the main support to an outside of the sidewall of the main support; and
   a lower cover arranged to surround the outside of the sidewall of the main support, and provided with a shock-absorbing member extending from an upper portion of a sidewall of the lower cover, and clipped and folded in a direction of the driver integrated circuit except some parts of both edges of the upper portion of the sidewall of the lower cover,
   wherein the shock-absorbing member of the lower cover is positioned inside the groove of the main support with a stepped portion formed with respect to the both edges of the upper portion of the sidewall of the lower cover, and the shock-absorbing member of the lower cover has at least a same width as that of the groove of the main support; and
   wherein the shock-absorbing member includes a rear and an upper surfaces thereof, and the rear surface of the shock-absorbing member is positioned to make contact with a bottom surface within the groove of the main support and the upper surface of the shock-absorbing member is positioned to make contact with a rear surface of the flexible printed circuit board.

2. The liquid crystal display device of claim 1, wherein the shock-absorbing member is provided in a form that is extended from the upper surface of the lateral portion thereof and folded by 90 degrees in a direction of the driver integrated circuit.

3. The liquid crystal display device of claim 1, wherein the keypad is arranged adjacent to the exposed region of the second substrate that does not overlap with the first substrate.

* * * * *